US012258788B2

(12) United States Patent
King et al.

(10) Patent No.: US 12,258,788 B2
(45) Date of Patent: Mar. 25, 2025

(54) SMART LOCK

(71) Applicant: Glue AB, Stockholm (SE)

(72) Inventors: Edward King, London (GB); Andoni Villarreal, Coulsdon (GB); Andrew Carson, Sale (GB); Sarah Liddell, Malmesbury (GB)

(73) Assignee: Glue AB, Stockholm (SE)

( * ) Notice: Subject to any disclaimer, the term of this patent is extended or adjusted under 35 U.S.C. 154(b) by 241 days.

(21) Appl. No.: 17/797,774

(22) PCT Filed: Feb. 8, 2021

(86) PCT No.: PCT/EP2021/052908
§ 371 (c)(1),
(2) Date: Aug. 5, 2022

(87) PCT Pub. No.: WO2021/156497
PCT Pub. Date: Aug. 12, 2021

(65) Prior Publication Data

US 2022/0403680 A1 Dec. 22, 2022

(30) Foreign Application Priority Data

Feb. 7, 2020 (GB) ..................................... 2001724

(51) Int. Cl.
*E05B 47/00* (2006.01)
*E05B 47/02* (2006.01)
(Continued)

(52) U.S. Cl.
CPC ........ *E05B 47/0012* (2013.01); *E05B 47/026* (2013.01); *E05B 47/0615* (2013.01);
(Continued)

(58) Field of Classification Search
CPC ............... E05B 47/0012; E05B 47/026; E05B 47/0615; E05B 55/00; E05B 2047/0058;
(Continued)

(56) References Cited

U.S. PATENT DOCUMENTS 4,313,320 A 2/1982 Best et al.
4,887,442 A * 12/1989 Lavelle .............. E05B 47/0673 70/277

(Continued)

FOREIGN PATENT DOCUMENTS

CN 105155935 A * 12/2015
CN 105952278 A * 9/2016 ............. E05B 15/00

(Continued)

OTHER PUBLICATIONS

Jun. 15, 2021—(WO) International Search Report and Written Opinion—PCT/EP2021/052908.

(Continued)

*Primary Examiner* — Eugene G Byrd
*Assistant Examiner* — James Edward Ignaczewski
(74) *Attorney, Agent, or Firm* — Banner & Witcoff, Ltd.

(57) ABSTRACT

A smart lock for securing a door comprising: a housing mountable to the door; an actuator within the housing configured to actuate a lock mechanism between a locked position and an unlocked position, the lock mechanism including a latch bolt with an angled front face, the latch bolt configured to be retractable against a biasing force provided by a biasing means such that the door is closeable when the lock mechanism is in the locked position; and a receiver within the housing configured to wirelessly receive a signal to control operation of the actuator; a sensor mountable exclusively to the door so as to generate a signal indicative of the door beginning to move; a controller arranged to receive the signal indicative of the door beginning to move, (Continued)

the controller configured to control the actuator to actuate the lock mechanism in response to the signal indicative of the door beginning to move.

17 Claims, 8 Drawing Sheets

(51) Int. Cl.
*E05B 47/06* (2006.01)
*E05B 55/00* (2006.01)
*G07C 9/00* (2020.01)

(52) U.S. Cl.
CPC .......... *E05B 55/00* (2013.01); *G07C 9/00182* (2013.01); *E05B 2047/0024* (2013.01); *E05B 2047/0058* (2013.01); *E05B 2047/0067* (2013.01); *E05B 2047/0084* (2013.01); *E05B 2047/0091* (2013.01)

(58) Field of Classification Search
CPC ..... E05B 2047/0067; E05B 2047/0084; E05B 2047/0091; G07C 9/00182
USPC ............................................................ 70/275
See application file for complete search history.

(56) References Cited

U.S. PATENT DOCUMENTS

| | | | | |
|---|---|---|---|---|
| 7,543,469 | B1 | 6/2009 | Tseng et al. | |
| 2009/0211319 | A1 * | 8/2009 | McCormack | G07C 9/00563 70/277 |
| 2012/0091737 | A1 | 4/2012 | Conley | |
| 2017/0161975 | A1 * | 6/2017 | Peng | E05B 47/0012 |
| 2017/0204636 | A1 * | 7/2017 | Sack | G07C 9/00309 |
| 2018/0171671 | A1 * | 6/2018 | Martin | E05B 15/10 |
| 2019/0234110 | A1 * | 8/2019 | Laporta | E05B 9/08 |
| 2020/0263449 | A1 * | 8/2020 | Rai | G07C 9/00571 |

FOREIGN PATENT DOCUMENTS

| | | | | | |
|---|---|---|---|---|---|
| CN | 106930618 | A | | 7/2017 | |
| CN | 110984708 | A | * | 4/2020 | |
| DE | 40 23 386 | A1 | | 1/1992 | |
| DE | 202009010418 | U1 | | 12/2010 | |
| FR | 3066214 | A1 | * | 11/2018 | G07C 9/00174 |
| JP | H08270292 | A | | 10/1996 | |
| JP | 2007-508480 | A | | 4/2007 | |
| JP | 2008-179997 | A | | 8/2008 | |
| JP | 2009108560 | A | * | 5/2009 | |
| JP | 2010-090540 | A | | 4/2010 | |
| JP | 2019-509413 | A | | 4/2019 | |
| JP | 2019-210619 | A | | 12/2019 | |
| WO | 2006/016826 | A2 | | 2/2006 | |
| WO | 2007/054728 | A2 | | 5/2007 | |
| WO | 2015/189391 | A2 | | 12/2015 | |
| WO | 2019/071306 | A1 | | 4/2019 | |

OTHER PUBLICATIONS

Aug. 3, 2020—(GB) Search and Examination Report—GB2001724.0.

Jun. 7, 2022—(GB) Further Examination Report—GB2001724.0.

Jun. 15, 2021—(WO) International Search Report and Written Opinion—PCT/EP2021/052910.

* cited by examiner

PRIOR ART

SMART LOCK

CROSS-REFERENCE TO RELATED APPLICATIONS

This application is a U.S. National Stage application under 35 U.S.C. § 371 of International Application PCT/EP2021/052908, filed Feb. 8, 2021, which claims the benefit of priority to United Kingdom Patent Application GB 2001724.0, filed Feb. 7, 2020. Benefit of the filing date of each of these prior applications is hereby claimed. Each of these prior applications is hereby incorporated by reference in its entirety.

BACKGROUND

The present invention relates to an improved smart lock, in particular an improved lock which includes a latch bolt with an angled front face, such as a rim lock or a sash mortice lock.

A rim lock is a prior art type of lock including a latch bolt with an angled front face which is designed to be mounted on an surface (or rim) of a door or an object, typically on an interior face. For a door, this is the face which can be accessed from the interior of the house or room. This contrasts to a mortice lock which is installed within a cavity in the door or object.

Typically, a rim lock will include a rim lock body or housing which is mounted on the door. A bolt extends from this housing, the bolt can typically be actuated by both an external key and by an internal handle. A keep is provided as the companion piece and is typically mounted on the door frame. The keep includes a cavity for receiving the bolt of the rim lock body in order to prevent the door from opening.

Exemplary rim locks may be found in U.S. Pat. No. 4,313,320 A and 3,006,179 A.

A sash mortice lock is a special type of mortice lock which has both a deadbolt and a latch bolt with an angled front face.

So-called "smart" locks have begun to enter the market for certain lock types, such as Euro Cylinder locks, or other morticed locks. However, these do not easily transfer to rim locks where different considerations are necessary.

A smart lock is an electromechanical lock which is designed to perform locking and unlocking operations on a door when it receives instructions from an authorized remote device, such as a smart phone, typically using a wireless protocol and a cryptographic key to execute the authorization process. The smart lock may also monitor access, or access attempts, and send alerts as necessary to the remote device. Smart locks may be used as a part of a smart home.

CN 105952278 A discloses a mechanical fingerprint lock cylinder and an implementation method.

CN 105155935 A discloses a trigger locking type door.

CN 106930618 A discloses a lock cylinder control system and method.

DE 202009010418 U discuses a door with a movable door leaf which closes an access opening.

FR 3066214 A discloses a method of managing an energy storage means (18) in an electrically autonomous lock.

JP H 08270292 A discloses an acceleration sensor, a car speed sensor and a door lock motor connected to a control section controlling a door lock.

US 2012/0091737 A discloses apparatus for detecting the initial shock of an earthquake and automatically locking a cabinet door before the occurrence of destructive ground motions.

There is therefore a need for an improved smart lock, such as a smart rim lock or a smart mortice lock, or a retro-fit smart lock that operates as a mortice lock.

STATEMENT OF THE INVENTION

The present invention provides a smart lock according to claim 1.

This allows the state of the door to be sensed with components solely mounted on the door, to avoid the need for additional components to be fitted and aligned on the frame or surrounding area. That is, the sensor can detect the movement of the door without the need for any components mounted on the door frame. By mounted exclusively on the door this means that there is not another component on the fixed element such as the frame.

The sensor may comprise one or more accelerometers. Accelerometers are particularly convenient to detect movement with sensors installed solely on the door.

The sensor may comprise an inertial measurement unit, preferably a six-axis inertial measurement unit. This provides a high degree of accuracy in relation to the movement of the door.

The smart lock may further comprise a user input for receiving a lock command, wherein the controller is configured to: receive the lock command and monitor the signal indicative of the door beginning to move; and control the actuator to actuate the lock mechanism in response to receiving the lock command and the signal indicative of the door beginning to move. This allows the user to trigger locking of the door, for example when they are leaving the property. The beginning to move may be in an opening or closing direction of the door.

The controller may be configured to actuate the lock mechanism a predetermined time period after receiving the signal indicative of the door beginning to open. This delay reduces the risk of the lock being actuated at an inappropriate time which could prevent the lock from correctly locking.

The controller may be configured to actuate the lock mechanism when the signal indicative of the door beginning to open exceeds a threshold value. This threshold value may correspond to an amount of opening of the door. This prevents initial movement of the door incorrectly triggering the lock mechanism.

The threshold value may correspond to the door having passed through at least 5% of its fully open movement, preferably at least 15% of its fully open movement, more preferably at least 25% of its fully open movement. This can be a suitable value to indicate that the door is in an opening process.

The sensor may be configured to detect one of: movement of the housing; or movement of the door. Either of these are suitable to determine the opening process has begun.

The lock mechanism may comprise a bolt, the bolt moveable between a first position where it protrudes from the housing of the smart lock when the lock mechanism is in the locked position and a second position where it is retained within the housing when the lock mechanism is in the unlocked position. This differentiates the smart lock from an adaptor kit where an existing lock mechanism is merely controlled by a smart lock. In such a use case the smart lock is typically only acting as a controller and is not involved with the mechanism of holding the door closed or secure.

The bolt is biased towards the first position by biasing means; and the stall torque of the actuator may be such that the actuator retains the bolt in the second position against the force of the biasing means. This allows the smart lock to be latched or temporarily retained in the retracted second position without the motor drawing additional power, thereby preserving battery life.

The stall torque of the actuator may be greater than the torque applied on the actuator by the biasing force of the biasing means when the bolt is in the second position. This stall force is not overcome by the biasing force such that the smart lock can be latched or temporarily retained in the retracted second position without drawing additional power, thereby preserving battery life.

The bolt may comprise a recess arranged to receive the actuator when the latch bolt is in the second position. This allows the bolt length to be maximised while effectively mounting the components within the housing. One or more other components may also be received in this recess in the second position including but not limited to a battery; a circuit board; a controller; a receiver; and/or a transmitter.

The bolt may have a bolt throw of between 14 millimetres to 20 millimetres. Such a bolt throw provides a high level of security.

The smart lock may be a rim lock and comprise the lock mechanism. In a rim lock arrangement, the actuator and the lock mechanism are contained within the housing and are attachable to the surface of the door. This contrasts to a mortice lock where the lock mechanism is within the door. In use, the user pushes the door shut with the latch bolt in an extended position. As the angled face of the latch bolt contacts the keep, or strike plate, it is pushed back against the biasing force. Once the latch bolt is entirely aligned with the keep, or strike plate, the biasing force then returns the latch bolt to the extended position to lock the door.

The lock may be a mortice lock and the lock mechanism is contained within the door and further comprises a deadbolt. An example of a mortice lock is a sash mortice lock which includes a deadbolt and a latch bolt with an angled face. The benefits of the motion sensing can therefore be applied to such a lock. In such a lock the lock mechanism is not a part of the smart lock but is instead a component of the door.

When the lock is a sash mortice lock, the locked position of the lock mechanism may include a first locked position where the latch bolt protrudes from the door and a second locked position where the latch bolt and the deadbolt protrude from the door. Thus the lock can provide multiple levels of security.

When the lock is a sash mortice lock, the lock mechanism may be moveable in order from the second locked position, to the first locked position, to the open position. That is, from a fully locked position first the deadbolt is retracted followed by the latch bolt with the angled face. This means that both bolts can be controlled by the same mechanism.

DETAILED DESCRIPTION

Figure 1:
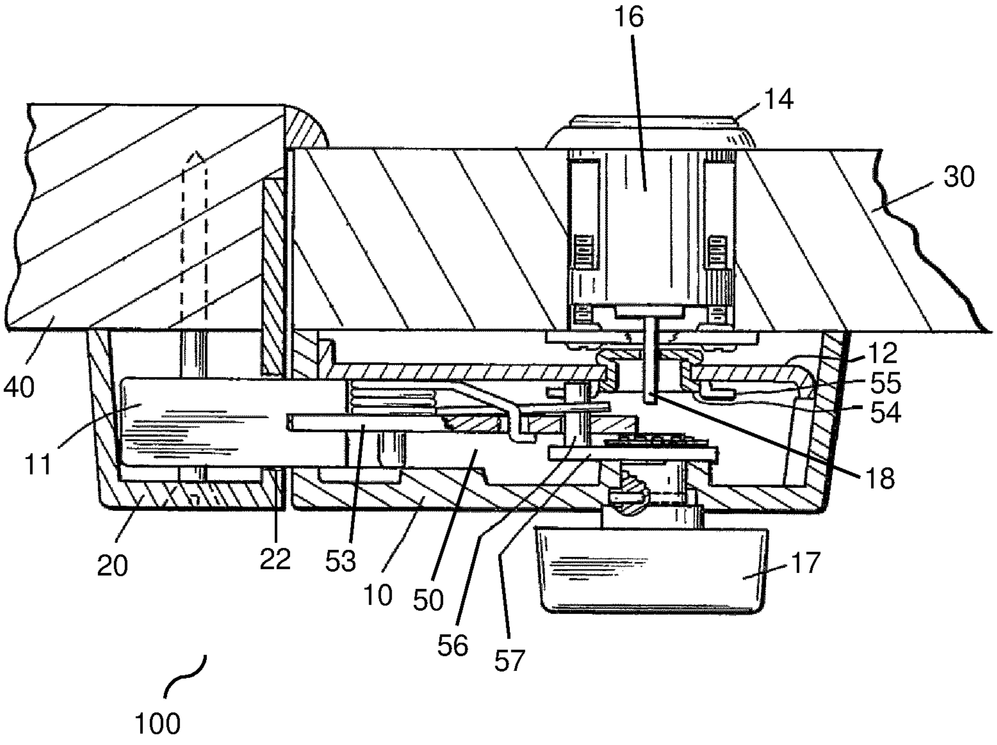
FIG. 1 shows a cross-section of a prior art rim lock.

A prior art rim lock is shown in FIG. 1, which is modified from 4 313 320 A. While U.S. Pat. No. 4,313,320 A is specifically directed to the implementation of what they describe as a "classroom" function, the general working principles of a rim lock are the same. While some of the improvements discussed in relation to the present invention are specific for rim locks 100, it is also appreciated that any improvement can also be applied to other types of locks, such as mortice locks, as appropriate.

The rim lock 100 comprises a rim look body 10 and a keep 20. The rim lock body 10 is mounted onto a closure such as a door 30. The rim lock body 10 may also be generally referred to as a housing 10 for the rim lock 100. The door 30 may be a door for ingress into a room, or may be a door for a cupboard, safe or any other suitable closure. The rim lock body 10 is be attached to the door 30, for example via attachment means such as screws passing through a back plate 12. It is possible to attach the rim lock body 10 directly to the door 30. However, the best practice is to use such a back plate 12. The rim lock body 10 may then snap-fit or attach to the back plate 12 via any known mechanism.

On the opposite side of the door 30, there is provided a key plate 14 with a keyhole for receiving a key to operate the rim lock 100. A key cylinder 16 extends from this key plate 14. The key cylinder 16 is a typical barrel cylinder which operates according to the known principles to rotate when the correct key is inserted into the keyhole and turned. A tail piece 18 extends from the key cylinder 14. The tail piece 18 turns when a key inserted into the key cylinder 16 is turned. The key cylinder 16 extends into a bore formed in the door 12 and the tail piece 18 extends therefrom to pass through the back plate 12 into the rest of the rim lock body 10.

The keep 20 is attached to a frame 40 of the door 30. Alternatively, the keep 20 may be formed within the frame 40 of the door. The frame 40 may be a specifically designed door frame, or may merely be the surrounding surface adjacent the door 30. The keep 20 includes a cavity 22 which is arranged to receive a bolt 11. When the keep 20 receives the bolt 11, the rim lock 100 inhibits and prevents the door 30 from opening.

The bolt 11 is operated between a locked (or closed) position and an unlocked (or open) position by a lock mechanism 50 within the rim lock body 10. This lock mechanism 50 can be actuated either by a key inserted into the keyhole, or via rotation of a handle 17, known in the art as a thumb turn 17.

The rear of the bolt 11 is formed with a transverse slot which receives the front end of a draw plate 53 to which the head is attached, for example by a pair of pins. However, this is a particular of the specific design and many other variations exist. For example, the draw plate 53 may be integrally formed with the bolt 11.

A crank arm 57 is mounted for rotation with the thumb turn 17. A crank pin 56 extends through the plane of the bolt draw plate 53. Rotation of the thumb turn 17 thus moves the draw plate 53 to retract the bolt 11.

Likewise, the tail piece 18 is attached to a T-shaped cam 54 which is rotatably mounted in the rim lock body 10. This cam 54 includes cam arms 55 which engage the crank pin 56 and rotates with the key so as to move the draw plate 53 to retract the bolt 11. The cam arms 55 form the wings of the T-shape extending from the central portion.

In this sense, the lock mechanism 50 can be actuated either by the thumb turn 17 or the key cylinder 14.

Figure 2:
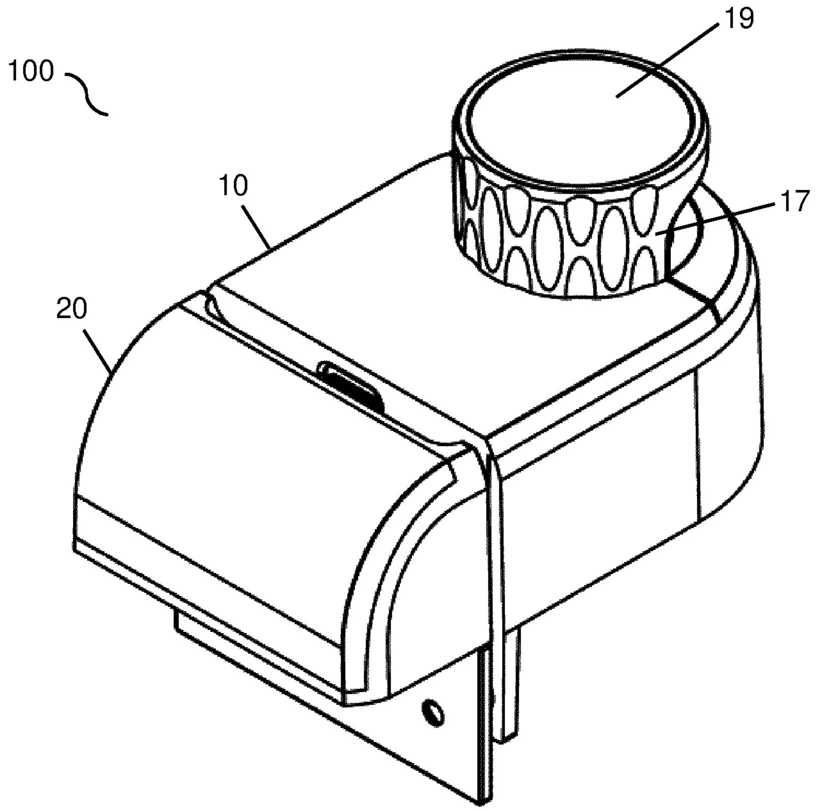
FIG. 2 shows a perspective view of a smart rim lock according to the present invention.

A rim lock 100 according to the present invention is shown in perspective in FIG. 2. As can be seen from this Figure, the rim lock 100 generally comprises a rim body, or housing, 10 and keep 20 as in the prior art rim lock 100. Unless expressly specified otherwise, common features of the smart rim lock 100 are as described in relation to the prior art rim lock 100 of FIG. 1. The key difference that makes the rim lock "smart" is that it includes an actuator and a receiver configured to wirelessly receive a signal to control operation of the actuator. This allows the smart rim lock 100 to be connected to, for example, the Internet of Things. Thus the smart rim lock 100 can be controlled remotely via a user on a remote device, as well as manually locally via the handle 17 or a key. For example, the user may be able to actuate the smart rim lock 100 with be an application (app) on a user's smart phone.

Figure 3:
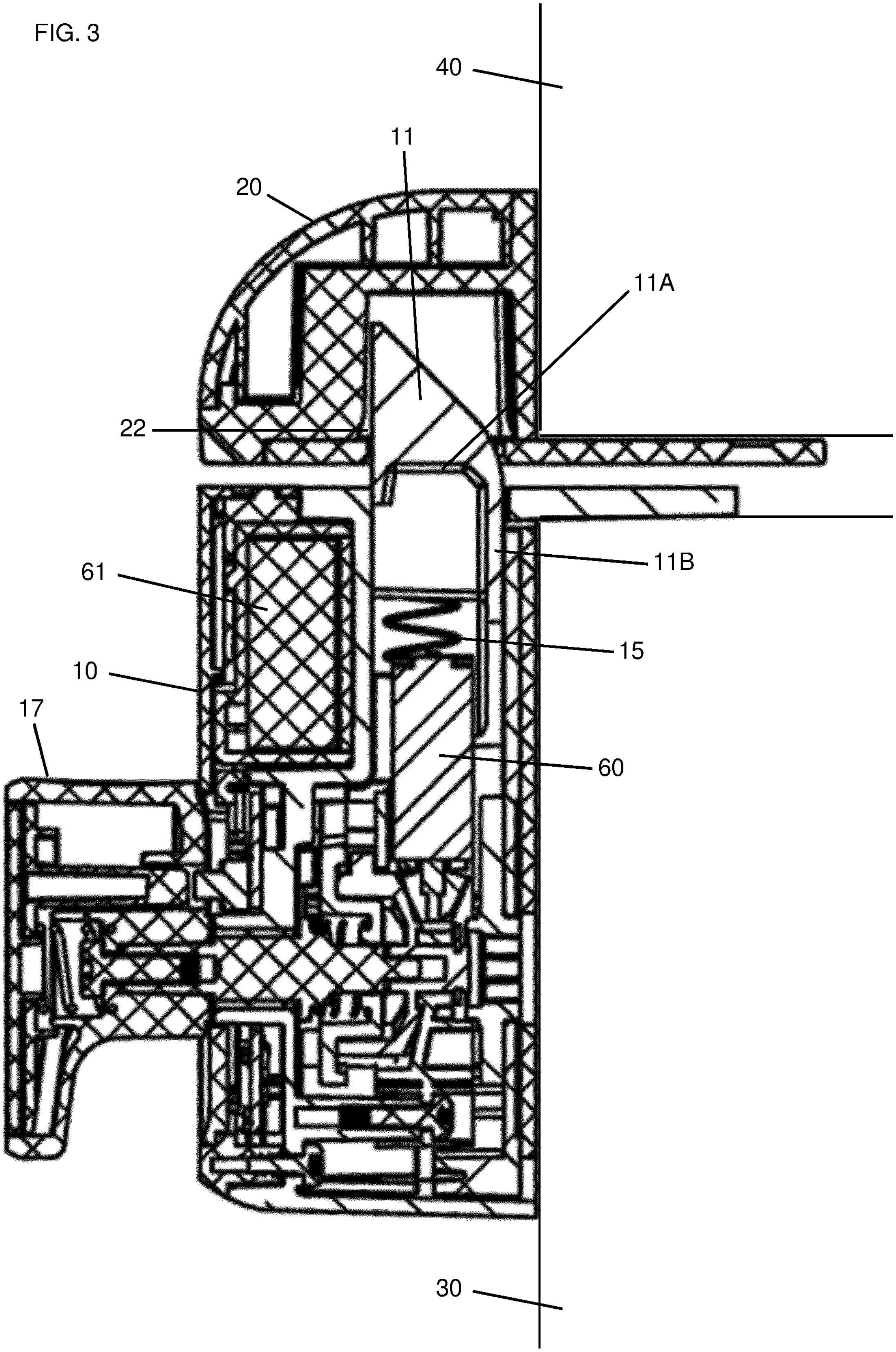
FIG. 3 shows a cross-section of the smart rim lock of FIG. 2.
Figure 4:
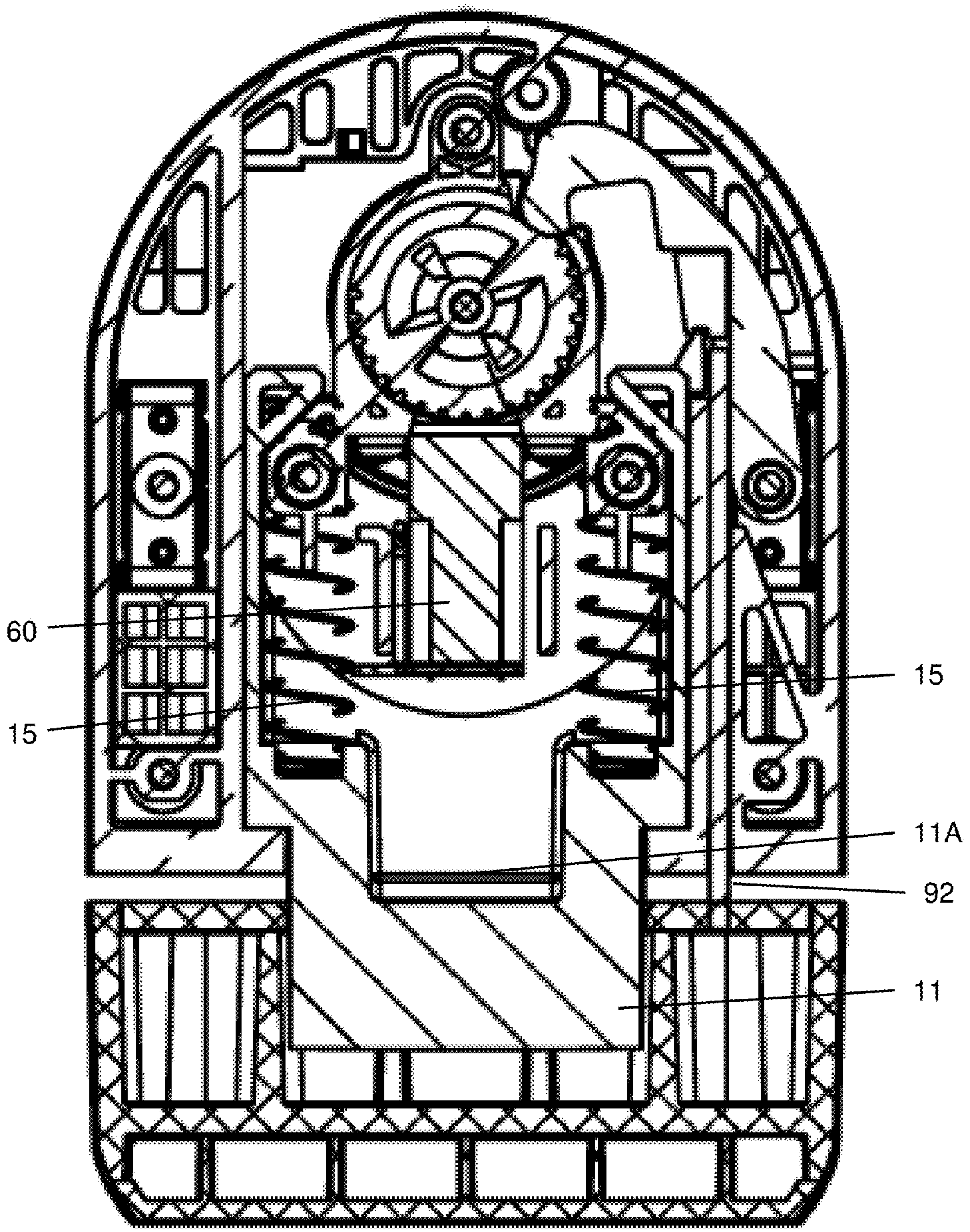
FIG. 4 shows a further cross-section of the smart rim lock of FIG. 2.

FIGS. 3 and 4 show cross-sectional views of the rim lock 100 of FIG. 2. The rim lock 100 comprises a latch bolt 11 (referred to for simplicity as bolt 11) which is connected to a throw arm 52. The throw arm 52 may be integral with the bolt 11 or may be formed as a separate component attached thereto. The throw arm 52 is formed as a central body with two throw arms 52A extending from opposite sides therefrom into the rim body 10 away from the bolt 11. The bolt 11 and the throw arms 52 form a lock mechanism. It is possible for the lock mechanism to have one or more throw arms 52.

The bolt 11 is moveable between a first position, also known as a locked position, shown in FIG. 3 in which the bolt 11 extends into the cavity 22 of the keep 20 to prevent the door 30 from being opened and a second position, also known as an unlocked position, where the bolt 11 is retracted from the keep 20 such that the door 30 can be opened. The bolt 11 is biased towards the locked position by one or more biasing means, which may be a resilient member such as one or more springs 15, but could also be any element which provides a biasing force such as a magnet.

The bolt 11 may have a bolt throw of 14 millimetres to 20 millimetres, or of at least 20 millimetres. Other sizes of bolt throw are also possible, but generally result in a less secure lock, which should not be used as a single lock on a door. The bolt throw is the distance the bolt 11 travels under the action of the key to retract it from the keep 20. That is, the amount the bolt 11 extends from the body 10 into the keep 20. A bolt throw in this range allows the rim lock 100 to be compliant with the highest security levels of current standards as a longer bolt throw generally corresponds to a more secure lock. For example, this may be British Standard BS3621, or BS8621, or TS621 which is specifically a standard for smart locks. If the rim lock 100 is complaint with the highest level of the relevant standard it may be used as the sole lock on the door 30. Otherwise, a secondary lock may be necessary, such as an additional five lever mortice lock. In particular, many insurers require a lock compliant with BS3621 to be provided on the door 30 in order for home and contents insurance to be valid.

The total bolt throw needs to be able to be received in the rim lock body 10 when the bolt 11 is retracted. In conventional rim locks (such as FIG. 1) this is not a particular issue as there are large amounts of empty space within the rim lock body 10. However, the smart rim lock 100 of the present invention also needs to house the actuator 60 (in the particular embodiment, the actuator 60 is a motor 60, but any other suitable actuator 60 may be used), battery 61, and the associated circuitry and mechanisms.

As such, in the present invention the bolt 11 is cored out to form a recess 11A. when the bolt 11 is retracted in the unlocked position, the recess 11A receives the motor 60. In other words, the bolt 11 is formed of head which is full-sized according to prior art locks, with a thin body portion 11B extending therefrom. The thin body portion 11B may have a thickness of less than 10 millimetres, preferably less than 5 millimetres.

In use, the various cams engage with the throw arms 52A to retract the bolt 11. The lock mechanism 50 is individually actuatable by each of an actuator cam 64 (also known as a motor cam 64), a handle cam 74 (also known as a thumb turn cam 74) and a key cam 84. Each of these cams are rotatably mounted within the rim lock body 10 about generally coincident axes of rotation. This axis of rotation is generally transverse, or perpendicular, to the direction of movement of the latch 11. The cams 64, 74, 84 are each independently rotatable within the rim lock 100. The key cam 84 is nearest the door 30, and the handle cam 74 is further the door 30. The motor cam 64 is between the key cam 84 and the handle cam 74.

The smart rim lock 100 may further comprise a controller, memory, processors, a receiver for wireless communication, a transmitter for wireless communication, etc. The controller may control actuation of the motor 60 to move the bolt 11 between the unlocked and locked positions. The receiver is able to wirelessly receive a user command to move the bolt 11 between the unlocked and the locked position. The wireless communication may be via any suitable protocol, for example Bluetooth, Wi-Fi, Li-Fi, or any combination of these. The user command may be transmitted directly from a user's remote device such as a smart mobile phone, preferably via a companion application. Alternatively, or additionally, the smart rim lock 100 may communicate with a smart hub which itself is in communication with the user's remote device.

In order to improve connectivity of the receiver, the back plate 12 of the smart rim lock 100 may be formed of material which is relatively conductive of the communication protocol. For example, the back plate 12 may be formed of as plastic such as glass filled polycarbonate.

FIGS. 5A and 5B, 6A and 6B, and 7A and 7B show the opening movements for each of the thumb turn opening, motor opening, and key opening respectively. In each of these Figures, the biasing members 15 have been hidden to allow the respective mechanisms to be more easily viewed. The actuator or motor 60 has been omitted from each Figure except for FIG. 6A, for the same reason. The motor 60 may be positioned between any of the cams 64, 74, 84.

Figure 5A:
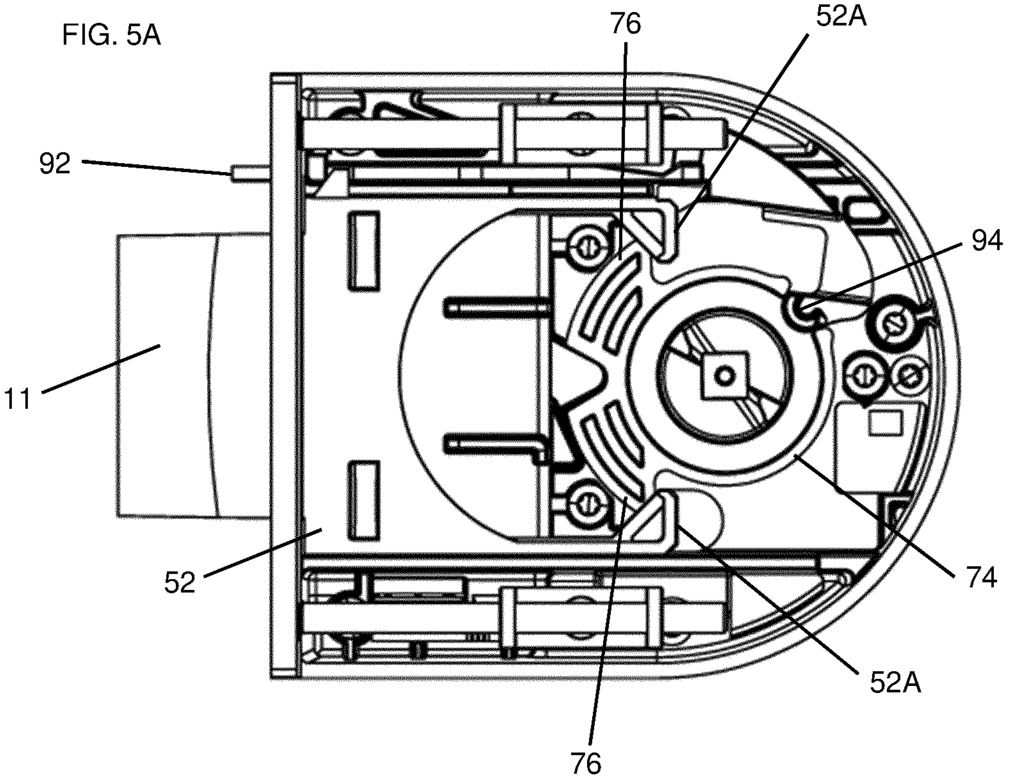
FIGS. 5A and 5B show a top view of the smart rim lock of FIG. 2 being operated via a key, with components omitted for ease of reference.
Figure 5B:
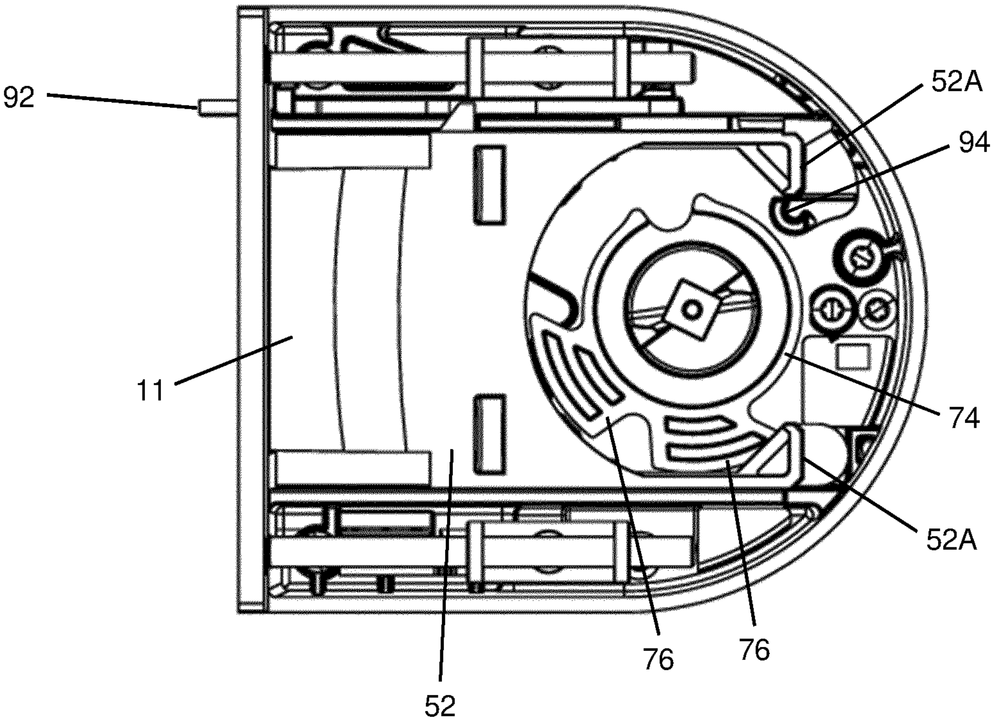

FIG. 5A shows a partial cross-section of the rim lock 100 to illustrate opening via the thumb turn 17 (also known as a handle). The thumb turn cam 74 is rotatably mounted within the rim lock body 10 as described above. The thumb turn cam 74 comprises one or more radially extending protrusions 76. The radially extending protrusions 76 are arranged to engage with the throw arms 52A as the thumb turn cam 74 is rotated. In use, the thumb turn 17 is rotated by a user. This causes the thumb turn cam 74 to likewise rotate. As the thumb turn cam 74 rotates the protrusion 76 engages with the throw arm 52A to actuate the lock mechanism and retract the bolt 11 as shown in FIG. 5B. The thumb turn cam 74, and the components operatively connecting the thumb turn 17 and the thumb turn cam 74 form the thumb turn mechanism or handle mechanism.

As shown in the example of FIGS. 5A and 5B the thumb turn protrusions 76 extend over enough of the circumference of the thumb turn cam 74 that the thumb turn cam 76 can be rotated in either direction to retract the bolt 11. While the depicted example has two thumb turn protrusions 76, the same effect could be achieved with a single thumb turn protrusion 76 which may extend over the same circumferential extent of the thumb turn cam 76.

Figure 8:
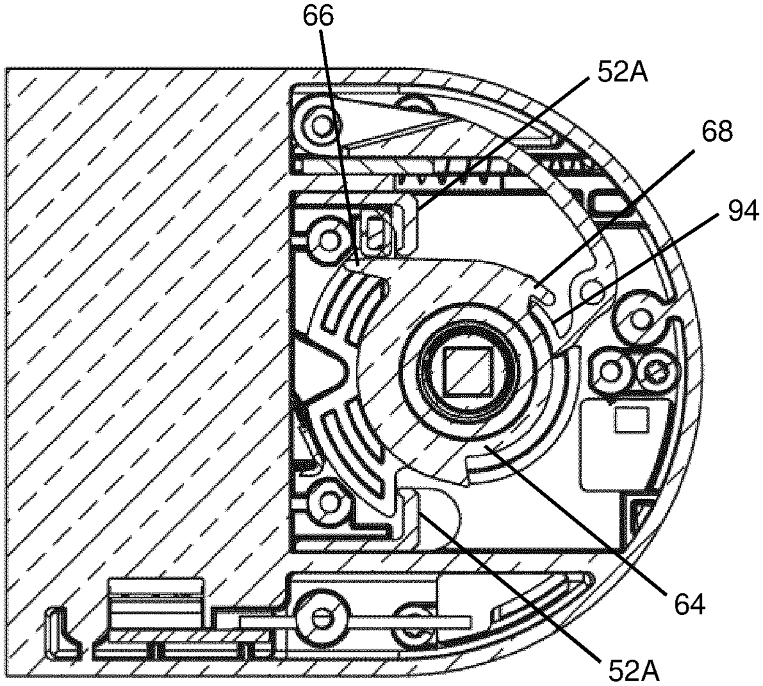
FIG. 8 shows a cross-section of a smart rim lock with a modified motor cam.

A clutch arm 94 is provided, actuated by a snib 92. This clutch arm 94 acts to prevent the smart lock 100 from being forced open (jimmied). The clutch arm 94 is biased towards a position as shown in FIG. 5B where it is disengaged from the key cam 74. In this position the snib 92 it in its most extended position from the smart lock 100. When the door is closed, the snib 92 engages a face on the keep 20, forcing it to retract. This movement of the snib 92 then moves the clutch arm 94 to the position shown in FIG. 6A where it engages with the key cam 64. In this position, the clutch arm 94 prevents the bolt 11 from moving. A further arrangement of the clutch arm 94 is shown in FIG. 8 and described below.

Figure 6A:
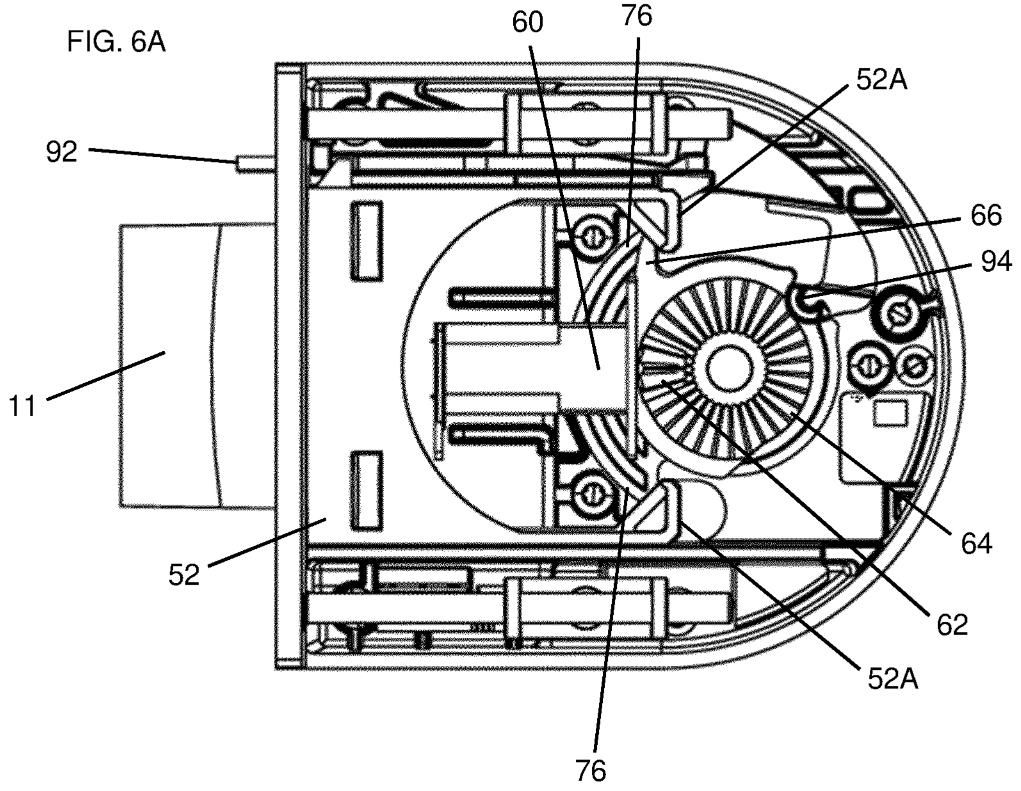
FIGS. 6A and 6B show a top view of the smart rim lock of FIG. 2 being operated via an actuator, with components omitted for ease of reference.
Figure 6B:
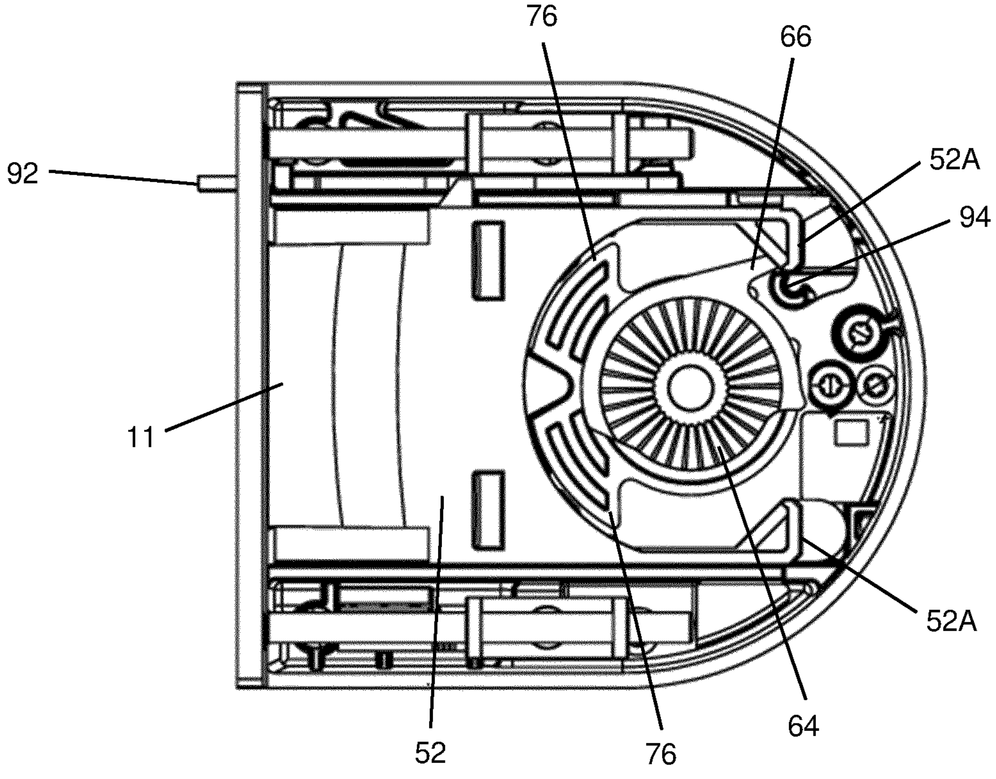

Actuation of the lock mechanism using the motor 60 is shown in FIGS. 6A and 6B. Attached to the output shaft of the motor is a bevel gear 62. This bevel gear 62 engages with a corresponding geared surface on the motor cam 64. Thus, actuation of the motor 60 drives rotation of the bevel gear 62 and hence rotation of the motor cam 64. The motor cam 64 is provided with a motor cam protrusion 66. As the motor cam 64 rotates the motor cam protrusion 66 engages with the throw arm 52 to thereby retract the bolt 11 to the unlocked position. The motor bevel gear 62 and motor cam 64 form the motor mechanism. While the motor cam protrusion 66 could be similar to the thumb turn protrusion 76 in that it could be shaped so that the motor cam 64 can rotate in either direction to actuate the lock mechanism, this is not necessary. Instead, additional functionality can be imparted into the smart lock 100 as discussed below by having the motor cam 64 have a single direction of operation to actuate the bolt 11.

The smart lock 100 may be retained in the unlocked position shown in FIG. 6B to latch the lock 100. This may be used when the user does not want the door 20 to be locked, for example if they are heading out briefly such as to take out their garbage. Typically, this is achieved with a mechanical button on the face of the rim lock 100. This mechanical button can only be operated from within the property. As described above, the springs 15 are acting to bias the bolt 11 towards the locked position. Accordingly, the biasing force provided by the springs 15 needs to be overcome to retain the bolt 11 in the unlocked position of FIG. 6B. While this could be achieved by providing a constant output from the motor 60, this requires additional energy usage and hence a faster rate of drain of the battery 61.

Instead, it is preferable if the motor 60 and biasing member(s) 15 are selected such that the motor stall torque is greater than the torque transferred to the motor from the force of the biasing member(s) 15. Thus, the motor 60 is able to retain the bolt 11 in the unlocked position without drawing additional power. For example, the motor stall torque may be in the region of greater than 0.25 Nm, preferably greater than 0.275 Nm, most preferably greater than 0.29 Nm. Of course, the particular value for motor torque must be selected based upon the biasing member(s) 14 chosen and the particular mechanism. Such values of motor stall torque may be suitable, for example for biasing member(s) 14 which exert an opposing torque in the region of 2.5 Nm. The gearing connecting the motor 60 may be selected to gear up to this. This may be biasing member(s) 14 which provide a force in the region of 10 N to 11 N. The biasing force may be prescribed a minimum value in order to meet security levels of a particular standard, in a similar manner to the bolt throw.

This latching position may be triggered by a user pressing a button 19 on the rim lock 100, or on a remote device such as their mobile phone which is then transmitted to the rim lock 100. The button 19 may be, for example, provided on the thumb turn 17 as shown in FIG. 2. The smart lock 100 may include a transmitter for communication with a remote device, such as a user's smart phone or a smart hub. This allows the smart lock 100 to send the user an alert or notification when the latching has been engaged, to reduce the chance that the door 20 is accidentally left latched.

Figure 7A:
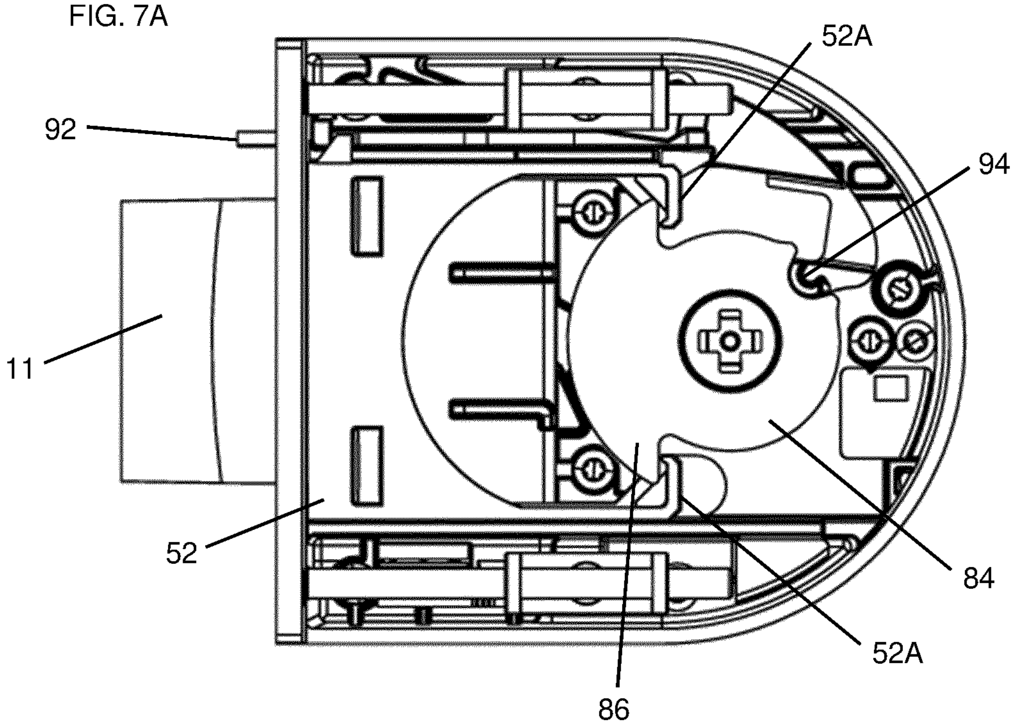
FIGS. 7A and 7B show a top view of the smart rim lock of FIG. 2 being operated via a handle, with components omitted for ease of reference.
Figure 7B:
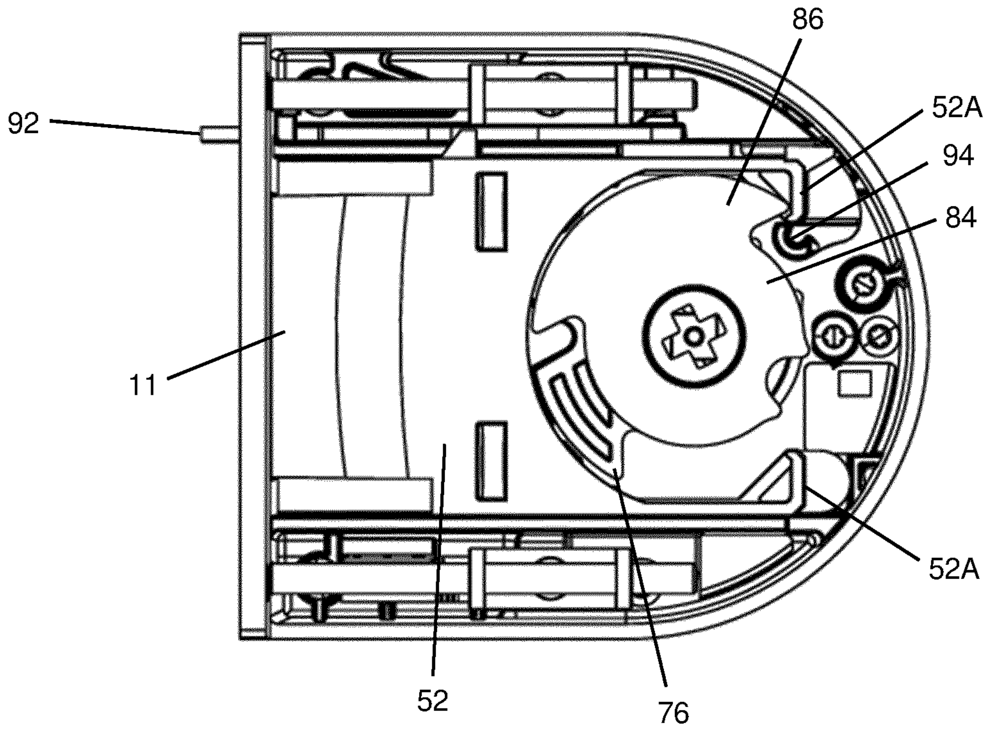

FIGS. 7A and 7B show operation of the rim lock 100 when actuated by the key. The key cam 84 is connected to the tail piece 18 of the key cylinder 16. In particular, there may be a slot arranged to receive the tail piece 18 of the key cylinder. As the tail piece 18 rotates when the correct key is inserted into the keyhole and turned, the cam 84 likewise rotates. The cam 84 comprises a key cam projection 86 which engages with the draw arm 52A to thereby retract the bolt 11 in a manner similar to the thumb turn cam 74 and motor cam 64. The connection between the tail piece 18 and the key cam 84, and the key cam 84, form the key mechanism.

For high security rim locks 100, it is preferable if the rim lock 100 can be placed into a state where the bolt 11 is not moveable from the locked position by one or both of the thumb turn 17 or the key cylinder 16. For example, overnight a user may wish to disable the key cylinder 16 so that even an intruder with the correct key cannot open the door 30. This may be useful, for example, where keys are borrowed by third parties. When a user is leaving their property for a long period of time they may wish to disable the thumb turn 17. This prevents an intruder that has accessed the property via another entry point (such as via a window) from being able to exit via the door 30. This may make it harder for the intruder to steal high value items which are difficult to transport through the initial entry point, such as a large television.

The smart rim lock 100 according to the present invention may disengage the key mechanism or the handle mechanism from the lock mechanism in order to prevent either the key cylinder 16 or thumb turn 17 from actuating the lock mechanism to move the bolt 11 to an unlocked position. In particular, this may be achieved via movement of the motor cam 64.

In particular, the motor cam 64 may be rotated in a direction opposite to the direction it rotates in to open the bolt 11 in order to disengage one or both of the thumb turn cam 74 and the key cam 84 from the lock mechanism. For example, the thumb turn cam 74 or key cam 84 may be moved in the direction of their axis of rotation. This may then move the cam 74, 84 out of alignment with the throw arms 52A. Then, the cams 74, 84 are able to freely rotate within the rim lock 100 without engaging the throw arms 52A. Accordingly, even as the cams 74, 84 rotate they will not engage the throw arms 52A and hence will not move the bolt 11 to the unlocked position.

This may be achieved by the motor cam 64 having one or more ramped surfaces on its faces. These ramped surfaces can then engage with corresponding surfaces on the thumb turn cam 74 and/or key cam 84 so as the move them out of alignment with the throw arms 52A. With the thumb turn cam 74 and/or key cam 84 out of alignment, they may engage with a protrusion on the housing of the smart lock 100 that prevents them from further movement or rotation.

Alternatively, or additionally, there may be a hooked surface on the motor cam 64. This hooked surface can engage the clutch arm 94 and therefore retain the thumb turn cam 74 and/or the key cam 84 in place. An example of this arrangement is shown in FIG. 8 and discussed below.

Thus, the thumb turn 17 and/or the key cylinder 16 can be effectively de-activated from controlling the lock mechanism.

FIG. 8 shows a further arrangement of the clutch arm 94 and motor cam 64, which may be applied to any of the arrangements described above. The smart lock 100 is generally as described above, and the operation of the various cams is as described above.

The motor cam 64 is provided with a protrusion 66 engages with the throw arm 52 to thereby retract the bolt 11 to the unlocked position. The motor cam 64 shown in FIG. 8 will rotate in an opposite direction (counter-clockwise based upon FIG. 8) compared to the motor cam 64 of FIGS. 5A to 7B. This does not fundamentally affect operation of the smart lock 100.

The motor cam 64 further comprises a hook 68. With the clutch arm 94 in the position engaging the key cam 84 (i.e. the door 30 is closed and the smart lock 100 is in the locked position), the motor cam 64 can be rotated such that the hook 68 engages with the clutch arm 94. The hook 68 engages with the clutch arm 94 and retains it in this position as shown in FIG. 8. Thus, the key cam 84 cannot rotate to open the smart lock 100. The rotation of the motor cam 64 to engage the hook 68 may be in the opposite direction to the rotation of the motor cam 64 to actuate the bolt 11.

The clutch arm 94 may further comprise a shoulder which abuts against at least one of the throw arms 52A of the bolt 11 in the locked position when the clutch arm 94 engages the key cam 84. Thus the clutch arm 94 may physically prevent the bolt 11 from moving.

With the bolt 11 in the latched position (i.e. retained by the motor 60 after an opening event), a user may wish to instruct the lock to close after the door has been shut. For example, this may be relevant if someone has used the app to move the bolt 11 to the unlocked position and they now wish to secure the door 30. Alternatively, a user approaching a locked door 30 may send a user input to the smart lock 100 that they would like to open the door.

In order to achieve this the rim lock 100 may include a timer which actuates the bolt 11 from the unlocked position to the locked position, or from the locked position to the unlocked position, after a predetermined time delay which may be triggered by the receipt of a user input. However, this may be unsuitable for many use cases. For example, if the user is not close to the door 30 when they send the signal to open the rim lock 100 this predetermined time delay may expire before the user reaches the door 30. This could be the case, for example, where a user is transporting an item such as shopping from a car. On the opposite side, if a user is very close to the door 30 when the send the opening command they may be able to open the door 30 and pass therethrough and go to shut the door before the predetermined time has expired. This may mean that the door 30 bounces back out of locked position, so that at the expiry of the predetermined time the bolt 11 is no longer aligned with the keep 20 and hence when the bolt 11 is moved to the locked position it is not retained within the keep 20 and hence the door 30 is unsecured.

In order to solve this, the rim lock 100 may comprise one or more sensors which are able to detect movement of the door 30 or an element attached to the door 30. Particularly, the sensors may detect when the door begins to open. While this could be achieved by having corresponding sensors, or elements of sensors on either side of the door 30 and frame 40, this is not a preferable solution as it requires a consistent alignment between these. Further, as this is an additional part it increases the cost and complexity. Many customers do not want to install another thing to their door or frame, and some door frames may be unsuitable for this based upon its thickness or architrave profile.

Instead, according to the present invention the movement of the door 30 is sensed by components solely, or exclusively, attached to the door 30. That is, there is a standalone sensor system which is able to detect movement of the door 30 without requiring any additional sensors mounted elsewhere. Of course, there may be additional sensors detecting other parameters mounted elsewhere.

After movement of the door 30 is sensed, the controller may control the motor 60 to actuate the lock mechanism to move the bolt 11 to the locked position. As in the present example the bolt 11 has a latch profile. That is, bolt 11 has an angled front face which allows the door 30 to be closed when the bolt 11 is in the locked position as the angled front face slides against the face of the keep 20 to retract the bolt 11 against the biasing member(s) 15. Particularly, the face of the bolt 11 which first contacts the keep 20 during a closing movement of the door may form an angle of between 20° to 70° with a first point of contact of the keep 20. The angle may be between 30° to 60°.

That is, the bolt 11 may have a generally right trapezoid shape when viewed in cross-section in a direction along its plane of movement. The bolt 11 may therefore by a right trapezoidal prism. Of course, deviations from the strict mathematical shape are still covered by this. The angled face may be curved rather than at a straight line. The relevant angle can then be defined based upon a tangent of this curve. Once the bolt 11 is aligned with the cavity 22 of the keep 20 the biasing members(s) 15 then return the bolt 11 to the locked position and thereby lock the door 30. This may be an active movement or it may be from a biasing force. Accordingly, the user can then push the door 30 closed from this position.

In particular, the lock may comprise an accelerometer to detect closing of the door 30. The accelerometer may sense the acceleration of the door 30, or of a component within the lock to detect the movement of the door 30. The accelerometer may be a part of an inertial measurement unit, such as a six-axis inertial measurement unit. Alternatively, any suitable sensor to detect movement of the door 30 may be used, such as a compass.

In particular embodiments, the smart rim lock 100 may also use a predetermined time delay. For example, the signal from the sensor may indicate that the door 30 has begun opening and a time delay may then begin before the bolt 11 is actuated to the locked position.

The controller may "learn" what opening of the particular door 30 looks like on the signal from the sensor by instructing the user to carry out a number of opening repetitions and recording the signal and storing this in some memory. In future opening events the signal received from the sensor may be compared to the stored signal to identify an opening event.

This method of determining when a door 30 has begun opening in order to actuate a lock mechanism may be applied more generally to any smart lock, whether it is a rim lock or otherwise. For example, this method may be applied to a smart lock for a mortice lock. The smart rim lock 100 may determine when the door has passed through a threshold opening amount, in order to distinguish over small movements when the door 30 is still closed. For example, the smart rim lock 100 may monitor for the door 30 past a threshold value which corresponds to the door being 5% of its fully open movement, preferably at least 15% of its fully open movement, more preferably at least 25% of its fully open movement.

The motion sensing of the door 30 may also be used to determine if, for example, the door has been opened by force such as being kicked in. The controller may detect that the door has begun to move, and that the lock mechanism has not been actuated. This may trigger a notification or alert, such as to a user's remote device.

In many situations, the smart rim lock 100 of the present invention will be used to replace a user's existing standard rim lock. For example, a user may be upgrading their existing rim lock to a smart rim lock 100. In such a scenario, the user may not want to change their keys. Therefore, the smart rim lock 100 according to the present invention can be used to replace an existing rim lock without replacing the key cylinder 16.

In order to carry out the replacement of an existing rim lock, the following steps may take place. Firstly, the rim lock body 10 of the previous rim lock may be detached from the back plate 12. The detachment of the rim lock body 10 will also typically detach all of the mechanisms of the previous rim lock. The back plate 12 is then detached from the door 30.

The key cylinder 12 is retained within the door 30 and not removed. A new back plate 12 suitable for the present smart rim lock 100 is then attached to the door 30. This may involve the door 30 having to be chiselled to account for any differences in the overhang of the bolt face between the existing rim lock and the new smart rim lock 100. As discussed above, the back plate 12 for the smart rim lock 100 may be more conductive of wireless signals than the back plate 12 of the previous rim lock 100.

With the new back plate 12 attached to the door 30, the rim lock body 10 of the smart rim lock 100 can then be attached to the back plate 12. The rim lock body 10 will have an opening in the key mechanism for receiving the tail piece 18 of the previous key cylinder 16.

While the keep 20 of the previous rim lock may not need to be replaced if it aligns with the latch 11 of the smart rim lock 100, it is preferable that it is replaced with the keep 20 for the smart rim lock 100 to ensure compatibility.

The smart rim lock 100 is thus installed on the door 30 to replace the previous rim lock without the need to replace the key cylinder 16. The user thus achieves the smart functionality without having to replace their keys.

This means that the smart rim lock 100 according to the present invention may be sold as a standalone item without a key cylinder 16. Alternatively, or additionally, a kit may be sold of the smart rim lock 100 with a key cylinder 16.

In particular, this method of replacement of an existing rim lock with a smart rim lock 100 may include the steps of: removing the housing 10 from the back plate 12; and then removing the back plate 12 from the door 30. The key cylinder 16 of the existing rim lock can then be kept. The smart rim lock back plate 12 is then installed onto the door 30. The smart rim lock 100 is then attached to the smart rim lock back plate 12. This attachment to the smart rim lock back plate 12 is so that the tail piece 18 is received by the smart rim lock 100 in an operable connection such that actuation of the key cylinder 12 actuates the key mechanism of the smart rim lock 100.

As discussed above, the motion sensing of the door 30 may be applied to other types of smart lock and not just a rim lock. A particular example of this is a mortice sash lock. With such a lock, there is a deadbolt and a latch bolt 11 which may both be controlled by a single tail piece 18. The latch bolt 11 may be generally similar to the latch bolt 11 described above, particularly in that it may be biased towards the extended position. The deadbolt does not include such an angled face and is generally a rectangular cuboid. Unlike a rim lock, the latch bolt 11 and lock mechanism are retained within the door 30, as opposed to the housing 10 of a rim lock. Thus, the latch bolt 11 protrudes from a side face of the door 30 to be received in a keep 20 or strike plate which may be formed into the door frame.

With the mortice sash lock in the fully locked position both the deadbolt and the latch bolt 11 are extended and locking the door 30, this is a second locked position of the lock mechanism 50. As the tail piece 18 rotates, the deadbolt is first retracted, but the latch bolt 11 is still extended. This is a first locked position of the lock mechanism 50. Further rotation of the tail piece 18 causes the retraction of the latch bolt 11 such that the lock mechanism 50 is in the unlocked position. When this is done by a user with a key in a key cylinder 16, the user will hold the key in the cylinder 16 to maintain the latch bolt 11 in the retracted position against the biasing force.

When the lock mechanism of the mortice sash lock is actuated via the actuator 60, the actuator 60 drives the lock mechanism 50 so as to first retract the deadbolt and then the latch bolt 11. If the actuator 60 were turned off the biasing force would drive the latch bolt 11 back to the extended position. If the door 30 were not yet open, such as if the user triggered the unlocking and was not immediately ready to open the door 30, the latch bolt 11 would then extend back into the keep 20 and prevent the door 30 from opening.

Thus, in a similar manner as to the rim lock 100, the mortice sash lock may comprise one or more sensors which are able to detect movement of the door 30 or an element attached to the door 30. This generally operates in the same manner as discussed above in relation to the rim lock 100.

The user triggers the actuator 60 to open the mortice sash lock, this causes the actuator 60 to rotate the tail piece, or lock cylinder, to first retract the deadbolt and then retract the latch bolt 11. The motor 60 stall torque is then used to hold the latch bolt 11 in the retracted position against the biasing force. After movement of the door 30 is sensed, the controller may control the motor 60 to actuate the lock mechanism to move the latch bolt 11 to the locked position. This may be an active movement or it may be from the biasing force. That is, the motor 60 may actuate the latch bolt 11 to a neutral position from which the latch bolt 11 can be moved to a fully extended position via the biasing force. This then allows the user to push the door 30 closed, after which the actuator may continue to actuate the deadbolt to fully lock the door.

The sensing mechanism may be as described above and may include any suitable variations and examples included. In this sense, the motion sensing may be applied to other lock types than a rim lock.

The invention claimed is:

1. A smart lock for securing a door comprising:

a housing mountable to the door;

an actuator within the housing configured to actuate a lock mechanism between a locked position and an unlocked position, the lock mechanism including a latch bolt with an angled front face, the latch bolt configured to be retractable against a biasing force provided by a biasing means such that the door is closeable when the lock mechanism is in the locked position; and a receiver within the housing configured to wirelessly receive a signal to control operation of the actuator;

a sensor mountable exclusively to the door so as to generate a signal indicative of the door beginning to move in an opening or closing direction of the door;

a controller arranged to receive the signal indicative of the door beginning to move in an opening or closing direction of the door, the controller configured to control the actuator to actuate the lock mechanism from the unlocked position to the locked position in response to the signal indicative of the door beginning to move in an opening or closing direction of the door.

2. The smart lock of claim 1, wherein the sensor comprises one or more accelerometers.

3. The smart lock of claim 1, wherein the sensor comprises an inertial measurement unit, preferably a six-axis inertial measurement unit.

4. The smart lock of claim 1, further comprising a user input for receiving a lock or an unlock command, wherein the controller is configured to:

receive the command and monitor the signal indicative of the door beginning to move in an opening or closing direction of the door; and control the actuator to actuate the lock mechanism in response to receiving the command and the signal indicative of the door beginning to move in an opening or closing direction of the door.

5. The smart lock of claim 1, wherein the controller is configured to actuate the lock mechanism a predetermined time period after receiving the signal indicative of the door beginning to move in an opening or closing direction of the door.

6. The smart lock of claim 1, wherein the controller is configured to actuate the lock mechanism when the signal indicative of the door beginning to move in an opening or closing direction of the door exceeds a threshold value.

7. The smart lock of claim 6, wherein the threshold value corresponds to the door having passed through at least 5% of its fully open movement, preferably at least 15% of its fully open movement, more preferably at least 25% of its fully open movement.

8. The smart lock of claim 1, wherein the sensor is configured to detect one of:

movement of the housing; or movement of the door.

9. The smart lock of claim 1, wherein the smart lock is a rim lock, and comprises the lock mechanism.

10. The smart lock of any claim 9, wherein the latch bolt is moveable between a first position where it protrudes from the housing when the lock mechanism is in the locked position and an second position where it is retained within the housing when the lock mechanism is in the unlocked position.

11. The smart lock of claim 10, wherein the latch bolt is biased towards the first position by biasing means, and a stall torque of the actuator is such that the actuator retains the bolt in the second position against the force of the biasing means.

12. The smart lock of claim 11, wherein the stall torque of the actuator is greater than the torque applied on the actuator by the biasing force of the biasing means when the latch bolt is in the second position.

13. The smart lock of claim 10, wherein the latch bolt comprises a recess arranged to receive the actuator when the latch bolt is in the second position.

14. The smart lock of claim 10, wherein the latch bolt has a bolt throw of 14 millimetres to 20 millimetres.

15. The smart lock of claim 1, wherein the lock is a sash mortice lock and the lock mechanism is configured to be contained within the door and further comprises a deadbolt.

16. The smart lock of claim 15, wherein the locked position of the lock mechanism includes a first locked position where the latch bolt is configured in use to protrude from the door and a second locked position where the latch bolt and the deadbolt are configured in use to protrude from the door.

17. The smart lock of claim 16, wherein the lock mechanism is configured in use to be moveable in order from the second locked position, to the first locked position, to the unlocked position.

* * * * *